(12) United States Patent
Hartwich et al.

(10) Patent No.: US 11,621,868 B2
(45) Date of Patent: *Apr. 4, 2023

(54) DEVICE FOR A USER STATION OF A SERIAL BUS SYSTEM, AND METHOD FOR COMMUNICATING IN A SERIAL BUS SYSTEM

(71) Applicant: Robert Bosch GmbH, Stuttgart (DE)

(72) Inventors: Florian Hartwich, Reutlingen (DE); Arthur Mutter, Neuhausen (DE); Steffen Walker, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 91 days.

This patent is subject to a terminal disclaimer.

(21) Appl. No.: 17/414,124

(22) PCT Filed: Dec. 11, 2019

(86) PCT No.: PCT/EP2019/084697
§ 371 (c)(1),
(2) Date: Jun. 15, 2021

(87) PCT Pub. No.: WO2020/126754
PCT Pub. Date: Jun. 25, 2020

(65) Prior Publication Data
US 2022/0052875 A1 Feb. 17, 2022

(30) Foreign Application Priority Data
Dec. 17, 2018 (DE) .......................... 102018221956.7

(51) Int. Cl.
*H04L 12/40* (2006.01)
*H04L 9/32* (2006.01)

(52) U.S. Cl.
CPC ...... *H04L 12/40169* (2013.01); *H04L 9/3247* (2013.01); *H04L 12/40013* (2013.01);
(Continued)

(58) Field of Classification Search
CPC ......... H04L 12/40169; H04L 12/40013; H04L 12/40039; H04L 12/40026; H04L 9/3247
See application file for complete search history.

(56) References Cited

U.S. PATENT DOCUMENTS 5,384,769 A  1/1995  Oprescu et al.
11,489,694 B2 * 11/2022  Mutter .............. H04L 12/40039
(Continued)

FOREIGN PATENT DOCUMENTS

CN   204576339 U   8/2015
DE   19926173 A1  12/2000
(Continued)

OTHER PUBLICATIONS

International Search Report for PCT/EP2019/084697, dated Jan. 29, 2020.
(Continued)

*Primary Examiner* — Steven G Snyder
*Assistant Examiner* — Christopher A Daley
(74) *Attorney, Agent, or Firm* — Norton Rose Fulbright US LLP; Gerard Messina (57) ABSTRACT

A device for a serial bus system. The device includes a receiver for receiving a signal from a bus, in which for a message that is exchanged between user stations of the bus system, the bus states of a signal received from the bus in the first communication phase differ from bus states of the signal received in the second communication phase. The receiver generates a digital signal based on the received signal, and outputs the signal to a communication control device to evaluate the data. The receiver uses a first reception thresh-
(Continued)

old and a second reception threshold in the second communication phase to generate the digital signal. The second reception threshold has a negative voltage value or has a voltage value that is greater than the largest voltage value that is driven by a user station of the bus system for a bus state in the second communication phase.

16 Claims, 7 Drawing Sheets

(52) U.S. Cl.
CPC .. *H04L 12/40026* (2013.01); *H04L 12/40039* (2013.01); *H04L 2012/40215* (2013.01)

(56) References Cited

U.S. PATENT DOCUMENTS

2012/0020401 A1   1/2012  Itou et al.
2022/0029850 A1*  1/2022  Mutter ................... H04L 12/40

FOREIGN PATENT DOCUMENTS

DE    102014223838 A1    5/2016
DE    102015222334 A1    5/2017

OTHER PUBLICATIONS

ISO 11898-2:2016 Standard, 2016, pp. 1-40.
ISO 11898-1:2015 Standard, 2015, pp. 1-74.

* cited by examiner

Fig. 13

DEVICE FOR A USER STATION OF A SERIAL BUS SYSTEM, AND METHOD FOR COMMUNICATING IN A SERIAL BUS SYSTEM

FIELD

The present invention relates to a device for a user station of a serial bus system, and a method for communicating in a serial bus system that operates with a high data rate and a high level of error robustness.

BACKGROUND INFORMATION

For the communication between sensors and control units, for example in vehicles, a bus system is frequently used in which data are transferred as messages under the ISO 11898-1:2015 standard, as a CAN protocol specification with CAN FD. The messages are transferred between the bus users of the bus system, such as the sensor, control unit, transducer, etc.

With the increasing number of functions of a technical facility or of a vehicle, the data traffic in the bus system also increases. Moreover, it is often necessary for the data to be transferred from the transmitter to the receiver more quickly than previously. As a result, the required bandwidth of the bus system is further increased.

To allow data to be transferred at a higher bit rate than with CAN, an option has been provided in the CAN FD message format for switching over to a higher bit rate within a message. In such technologies, the maximum possible data rate is increased beyond a value of 1 Mbit/s by using higher clocking in the area of the data fields. Such messages are also referred to below as CAN FD frames or CAN FD messages. With CAN FD, the useful data length of 8 bytes is increased up to 64 bytes, and the data transfer rates are much higher than with CAN.

Even though a CAN or CAN FD-based communications network provides a very large number of advantages with regard to its robustness, for example, its speed is much slower compared to a data transfer via 100Base-T1 Ethernet, for example. In addition, the useful data length of up to 64 bytes, achieved thus far with CAN FD, is too small for some applications.

SUMMARY

An object of the present invention is to provide a device for a user station of a serial bus system, and a method for communicating in a serial bus system, which solve the above-mentioned problems. In particular, an object of the present invention is to provide a device for a user station of a serial bus system, and a method for communicating in a serial bus system in which a high data rate and an increase in the quantity of the useful data per frame may be achieved with great flexibility during operation of a technical facility in which the bus system is used for communication, and with a high level of error robustness of the communication.

The object may be achieved by a device for a user station of a serial bus system in accordance with an example embodiment of the present invention. In accordance with an example embodiment of the present invention, the device includes a receiver for receiving a signal from a bus of the bus system, in which for a message that is exchanged between user stations of the bus system, the bus states of a signal received from the bus in the first communication phase differ from bus states of the signal received in the second communication phase, the receiver being designed to generate a digital signal based on the signal received from the bus, and to output the signal to a communication control device in order to evaluate the data contained in the digital signal, the receiver also being designed to use at least one first reception threshold and one second reception threshold in the second communication phase in order to generate the digital signal, and the second reception threshold having a negative voltage value or the second reception threshold having a voltage value that is greater than the largest voltage value that is driven by a user station of the bus system for a bus state in the second communication phase.

In accordance with an example embodiment of the present invention, due to the design of the device, it is possible to detect a transmission conflict, even in the case that both bus states in a frame are actively driven in the data phase. This also applies when a superimposition of driven signals occurs on the bus, resulting in "analog" levels on the bus. Therefore, it is possible to dispense with an evaluation by a microcontroller in the device and/or by the communication control device, which in such a case can no longer reliably detect a transmission conflict by comparing transmission signal TXD and reception signal RXD, since resulting reception signal RXD is no longer precisely predictable.

In accordance with an example embodiment of the present invention, due to the design of the device, each user station of the bus system is able to disturb or interrupt the transmission of any other arbitrary user station with an error frame. From the standpoint of the user this is very advantageous, since in the event of an error, time may be saved due to the fact that a message being sent at the time is aborted, and other information may subsequently be transferred on the bus. This is very useful, in particular for frames that are longer than a CAN FD frame with 64 bytes in the data phase, in particular for frames that are to contain 2-4 kbytes or more.

As a result, by use of the device in accordance with an example embodiment of the present invention, which in particular is a receiver or a transceiver device, reception of the frames may be ensured with great flexibility with regard to instantaneous events during operation of the bus system and with a low error rate, even with an increased volume of useful data per frame. It may thus be communicated in the serial bus system when a high data rate and an increase in the volume of the useful data per frame occur, also with a high level of error robustness.

By use of the device in the bus system, it is thus possible in particular to maintain an arbitration provided by CAN in a first communication phase and still increase the transfer rate considerably compared to CAN or CAN FD.

This contributes toward achieving a net data rate of at least 10 Mbps. In addition, the quantity of the useful data may be up to 4096 bytes per frame.

In accordance with an example embodiment of the present invention, the method carried out by the device may also be used when at least one CAN FD-tolerant CAN user station that is designed according to the ISO 11898-1:2015 standard and/or at least one CAN FD user station that transmit(s) messages according to the CAN protocol and/or CAN FD protocol are/is present in the bus system.

Advantageous further embodiments of the device of the present invention are disclosed herein.

According to one particular embodiment variant of the present invention, the receiver is designed to check at least the second reception threshold in a defined time window as to whether the signal received from the bus no longer falls below or exceeds the second reception threshold.

According to one exemplary embodiment of the present invention, the receiver is designed to use two reception thresholds, whose voltage values are equal in magnitude, in the second communication phase for generating digital signal RxD.

According to one exemplary embodiment of the present invention, in the second communication phase, for generating the digital signal the receiver is designed to use, in addition to the first reception threshold, a second reception threshold and a third reception threshold whose voltage values are equal in magnitude. Moreover, in the second communication phase, for generating the digital signal the receiver may be designed to additionally use a fourth reception threshold, having a voltage value that is greater than the largest voltage value that is driven by a user station of the bus system for a bus state in the second communication phase, for the receiver a different transmission conflict being detectable with the third reception threshold than with the fourth reception threshold.

According to the exemplary embodiments of the present invention, in the first communication phase the receiver is designed to use a reception threshold whose voltage value differs from the voltage values of the reception thresholds in the second communication phase.

According to one particular embodiment variant of the present invention, the bus states of the signal received from the bus in the first communication phase are generated with a different physical layer than the bus states of the signal received in the second communication phase.

In the first communication phase, it is possibly negotiated which of the user stations of the bus system in the subsequent second communication phase obtains, at least temporarily, exclusive, collision-free access to the bus.

The device possibly also includes a reception threshold adaptation device for evaluating the signal received from the bus with regard to the communication phase present at the time, and for switching the voltage value and the number of reception threshold(s) used, based on the result of the evaluation.

It is possible for the reception threshold adaptation device to switch the first reception threshold over to a different reception threshold when, after the first communication phase, in which no exclusive, collision-free access of a user station to the bus of the bus system is ensured, a switch is made over to the communication phase with the exclusive, collision-free access to the bus.

In accordance with an example embodiment of the present invention, the device may also include a transmitter for transmitting messages onto a bus of the bus system, the transmitter, when transmitting the various communication phases of a message, being designed to switch between a first operating mode and a second operating mode. In the first operating mode, the transmitter is possibly designed to generate a first data state as a bus state with different bus levels for two bus wires of the bus line, and to generate a second data state as a bus state with the same bus level for the two bus wires of the bus line, and in the second operating mode the transmitter being designed to generate the first and second data states in each case as a bus state with different bus levels for the two bus wires of the bus line.

The device described above may be part of a user station for a serial bus system which also includes a communication control device for controlling a communication of the user station with at least one other user station of the bus system.

In accordance with an example embodiment of the present invention, there is an option for the device to be designed to signal to the communication control device via the reception signal or via a signal via a separate line when an evaluation of the reception thresholds and optionally a temporal correlation between the transmission signal and the reception signal show that a transmission conflict is present on the bus, and the communication control device being designed to generate or abort the transmission signal based on the signal and/or to signal the transmission conflict to other user stations of the bus system.

In accordance with an example embodiment of the present invention, the user station described above may be part of a bus system which also includes a bus and at least two user stations that are connected to one another via the bus in such a way that they may communicate serially with one another. At least one of the at least two user stations is a user station described above.

Moreover, the object stated above may be achieved by a method for communicating in a serial bus system according to an example embodiment of the present invention. In accordance with an example embodiment of the present invention, the method is carried out using a receiver for receiving a signal from a bus of the bus system, the receiver carrying out the steps: receiving a signal from the bus of the bus system, in which for a message that is exchanged between user stations of the bus system, the bus states of a signal received from the bus in the first communication phase differ from bus states of the signal received in the second communication phase, generating a digital signal based on the signal received from the bus, and outputting the generated digital signal to a communication control device in order to evaluate the data contained in the digital signal, the receiver using at least one first reception threshold and one second reception threshold in the second communication phase in order to generate the digital signal, and the second reception threshold having a negative voltage value or the second reception threshold having a voltage value that is greater than the largest voltage value that is driven by a user station of the bus system for a bus state in the second communication phase.

The method yields the same advantages as stated above with regard to the device and/or the user station.

Further possible implementations of the present invention also include combinations, even if not explicitly stated, of features or specific embodiments described above or discussed below with regard to the exemplary embodiments. Those skilled in the art will also add individual aspects as enhancements or supplements to the particular basic form of the present invention, in view of the disclosure herein.

BRIEF DESCRIPTION OF THE DRAWINGS

The present invention is described in greater detail below with reference to the figures, and based on exemplary embodiments.

Unless stated otherwise, identical or functionally equivalent elements are provided with the same reference numerals in the figures.

DETAILED DESCRIPTION OF EXAMPLE EMBODIMENTS

Figure 1:
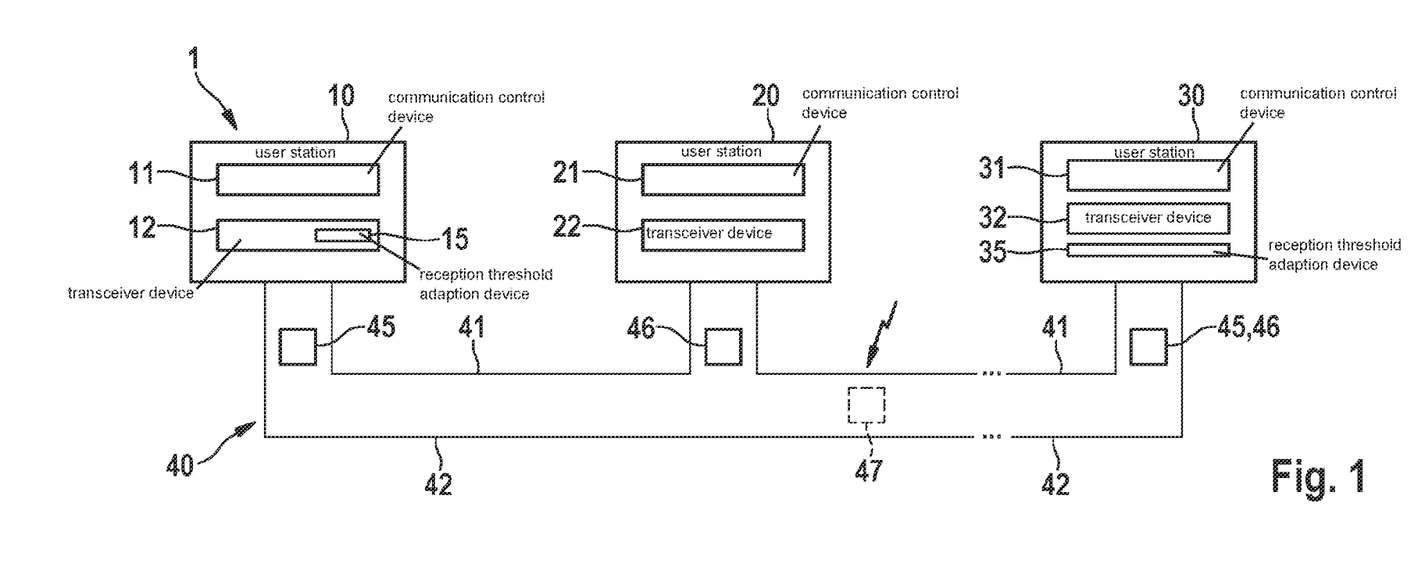
FIG. 1 shows a simplified block diagram of a bus system according to a first exemplary embodiment of the present invention.

FIG. 1 shows as an example a bus system 1 that is in particular the basis for the design of a CAN bus system, a CAN FD bus system, a CAN EL bus system, and/or modifications thereof, as described below. Bus system 1 may be used in a vehicle, in particular a motor vehicle, an aircraft, etc., or in a hospital, and so forth.

In FIG. 1, bus system 1 includes a plurality of user stations 10, 20, 30, each of which is connected to a first bus wire 41 and a second bus wire 42 at a bus 40. Bus wires 41, 42 may also be referred to as CAN_H and CAN_L or CAN EL_H and CAN EL_L, and are used for electrical signal transfer after coupling in the difference levels or generating recessive levels for a signal in the transmission state. Messages 45, 46 in the form of signals are serially transferable between individual user stations 10, 20, 30 via bus 40. If an error occurs during the communication on bus 40, as illustrated by the serrated dark block arrow in FIG. 1, an error frame 47 (error flag) is transmitted. User stations 10, 20, 30 are, for example, control units, sensors, display devices, etc., of a motor vehicle.

As shown in FIG. 1, user station 10 includes a communication control device 11, a transceiver device 12, and a reception threshold adaptation device 15. In contrast, user station 20 includes a communication control device 21 and a transceiver device 22. User station 30 includes a communication control device 31, a transceiver device 32, and a reception threshold adaptation device 35. Transceiver devices 12, 22, 32 of user stations 10, 20, 30 are each directly connected to bus 40, although this is not illustrated in FIG. 1.

Communication control devices 11, 21, 31 are each used for controlling a communication of particular user station 10, 20, 30 via bus 40 with at least one other user station of user stations 10, 20, 30 connected to bus 40.

Communication control device 11 creates and reads first messages 45, which are modified CAN messages 45, for example. Modified CAN messages 45 are built up based on a CAN EL format, described in greater detail with reference to FIG. 2.

Communication control device 21 may be designed as a conventional CAN controller according to ISO 11898-1: 2015. Communication control device 21 creates and reads second messages 46, for example conventional CAN messages 46. Conventional CAN messages 46 are built up according to the conventional base format, in which a number of up to 8 data bytes may be included in message 46. Alternatively, conventional CAN message 46 is built up as a CAN FD message, in which a number of up to 64 data bytes, which are also transferred at a much faster data rate than with conventional CAN message 46, may be included. In the latter case, communication control device 21 is designed as a conventional CAN FD controller.

Communication control device 31 may be designed to provide a CAN EL message 45 or a conventional CAN message 46 for transceiver device 32 or receive it from same, as needed. Communication control device 31 thus creates and reads a first message 45 or second message 46, first and second messages 44, 46 differing by their data transmission standard, namely, CAN EL or CAN in this case. Alternatively, conventional CAN message 46 is built up as a CAN FD message. In the latter case, communication control device 31 is designed as a conventional CAN FD controller.

Except for the differences described in greater detail below, transceiver device 12 may be designed as a CAN EL transceiver. Transceiver device 22 may be designed as a conventional CAN transceiver or as a CAN FD transceiver. Transceiver device 32 may be designed to provide messages 45 according to the CAN EL format or messages 46 according to the present CAN base format for communication control device 31 or receive the messages from same, as needed. Additionally or alternatively, transceivers 12, 32 may be designed as a conventional CAN FD transceiver.

A formation and then transfer of messages 45 having the CAN EL format, in addition to the reception of such messages 45, is achievable by use of the two user stations 10, 30.

Figure 2:
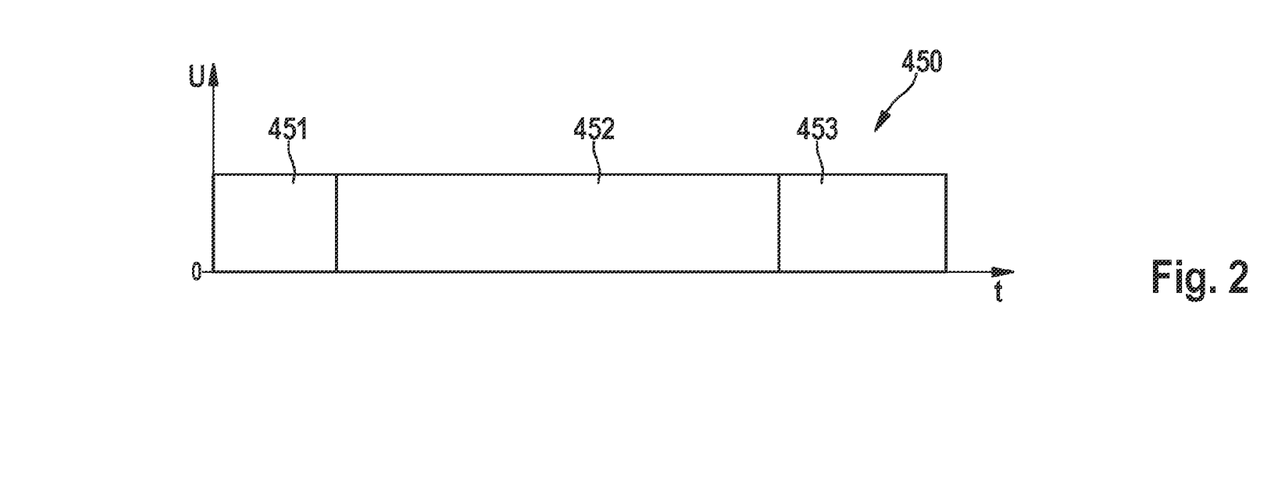
FIG. 2 shows a diagram for illustrating the design of messages that may be transmitted from a transceiver device for a user station of the bus system according to the first exemplary embodiment of the present invention.

FIG. 2 shows for message 45 a CAN EL frame 450, which is transmitted from transceiver device 12 or transceiver device 32. For the CAN communication on bus 40, CAN EL frame 450 is divided into different communication phases 451 through 453, namely, an arbitration phase 451, a data phase 452, and a frame end phase 453.

FIG. 2 shows for message 45 a CAN EL frame 450, which is transmitted from transceiver device 12 or transceiver device 32. For the CAN communication on bus 40, CAN EL frame 450 is divided into different communication phases 451 through 453, namely, an arbitration phase 451, a data phase 452, and a frame end phase 453.

In arbitration phase 451, with the aid of an identifier, bit-by-bit negotiation is carried out between user stations 10, 20, 30 concerning which user station 10, 20, 30 would like to transmit message 45, 46 having the highest priority, and therefore for the next time period for transmitting in subsequent data phase 452 obtains exclusive access to bus 40 of bus system 1.

The useful data of the CAN EL frame or of message 45 are transmitted in data phase 452. The useful data may include up to 4096 bytes, for example, or a greater value, corresponding to the value range of a data length code.

In frame end phase 453, a check sum of the data of data phase 452 may be contained in a check sum field, for example, including the stuff bits that are inserted as an inverse bit by the sender of message 45 in each case after a predetermined number of identical bits, in particular 10 identical bits. In addition, in frame end phase 453 at least one acknowledge bit may be contained in an end field. Furthermore, a sequence of 11 identical bits that indicate the end of CAN EL frame 450 may be present. By use of the at least one acknowledge bit, it may be communicated whether or not a receiver has found an error in received CAN EL frame 450 or message 45.

A physical layer, similarly as with CAN and CAN FD, is used at least in arbitration phase 451 and frame end phase 453. The physical layer corresponds to the bit transfer layer or layer one of the convention Open Systems Interconnection (OSI) model.

An important point during phases 451, 453 is that the conventional CSMA/CR method is used, which allows simultaneous access of user stations 10, 20, 30 to bus 40 without destroying higher-priority message 45, 46. It is thus possible to add further bus user stations 10, 20, 30 to bus system 1 in a relatively simple manner, which is very advantageous.

Consequently, the CSMA/CR method must provide so-called recessive states on bus 40, which may be overwritten by other user stations 10, 20, 30 with dominant states on bus 40. In the recessive state, high-impedance conditions prevail at individual user stations 10, 20, 30, which in combination with the parasites of the bus wiring result in longer time constants. This results in a limitation of the maximum bit rate of the present-day CAN FD physical layer to approximately 2 megabits per second at the present time during actual vehicle use.

A sender of message 45 starts a transmission of bits of data phase 452 onto bus 40 only after user station 10, as the sender, has won the arbitration, and user station 10, as the sender, thus has exclusive access to bus 40 of bus system 1 for the transmission.

In general, in the bus system with CAN EL, in comparison to CAN or CAN FD in particular the following differing properties may be achieved:

a) acquiring and optionally adapting proven properties that are responsible for the robustness and user-friendliness of CAN and CAN FD, in particular a frame structure including identifiers and arbitration according to the CSMA/CR method, b) increasing the net data transfer rate to approximately 10 megabits per second, c) increasing the quantity of the useful data per frame to approximately 4 kbytes.

Figure 3:
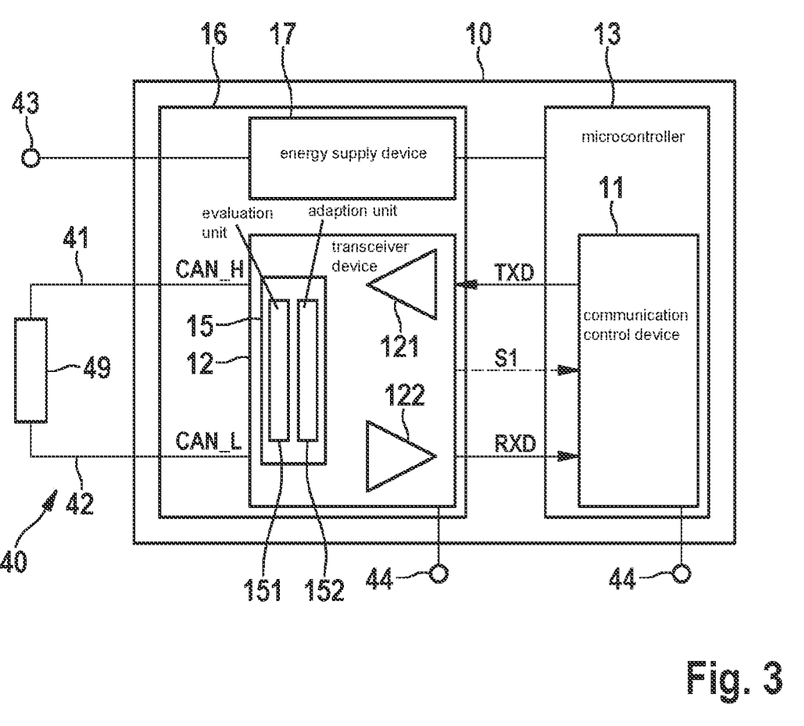
FIG. 3 shows a simplified schematic block diagram of a user station of the bus system according to the first exemplary embodiment of the present invention.

FIG. 3 shows the basic design of user station 10 together with communication control device 11, transceiver device 12, and reception threshold adaptation device 15. User station 30 has a design similar to that shown in FIG. 3, except that reception threshold adaptation device 35 is not integrated into transceiver device 32, but, rather, provided separately from communication control device 31 and transceiver device 32. Therefore, user station 30 and reception threshold adaptation device 35 are not separately described. The functions of device 15 described below are present in an identical form for device 35.

According to FIG. 3, in addition to communication control device 11, transceiver device 12, and device 15, user station 10 includes a microcontroller 13 with which control device 11 is associated, and a system application-specific integrated circuit (ASIC) 16, which alternatively may be a system base chip (SBC) on which multiple functions necessary for an electronics assembly of user station 10 are combined. In addition to transceiver device 12, an energy supply device 17 that supplies transceiver device 12 with electrical energy is installed in system ASIC 16. Energy supply device 17 generally supplies a voltage CAN_Supply of 5 V. However, energy supply device 17 may supply some other voltage having a different value, as needed. Additionally or alternatively, energy supply device 17 may be designed as a power source. Adaptation device 15 includes an evaluation unit 151 and an adaptation unit 152.

Optionally present between communication control device 11 and transceiver device 12 is a separate line via which an additional signal S1 is transmitted, via which a transmission conflict on bus 40 in data phase 452 may be communicated to communication control device 11, as described in greater detail below.

Transceiver device 12 also includes a transmitter 121 and a receiver 122. Even though transceiver device 12 is consistently referred to below, it is alternatively possible to provide receiver 122 in a separate device externally from transmitter 121. Transmitter 121 and receiver 122 may be designed as a conventional transceiver device 22. Transmitter 121 may in particular include at least one operational amplifier and/or one transistor. Receiver 122 may in particular include at least one operational amplifier and/or one transistor.

Transceiver device 12 is connected to bus 40, or more precisely, to its first bus wire 41 for CAN_H or CAN EL_H and its second bus wire 42 for CAN_L or CAN EL_L. The voltage supply for energy supply device 17 for supplying first and second bus wires 41, 42 with electrical energy, in particular with voltage CAN_Supply, takes place via at least one terminal 43. The connection to ground or CAN_GND is achieved via a terminal 44. First and second bus wires 41, 42 are terminated via a terminating resistor 49.

In transceiver device 12, first and second bus wires 41, 42 are not just connected to transmitter 121 and to receiver 122, even though the connection in FIG. 3 is not shown for simplification. In transceiver device 12, first and second bus wires 41, 42 are also connected to device 15.

Figure 4:
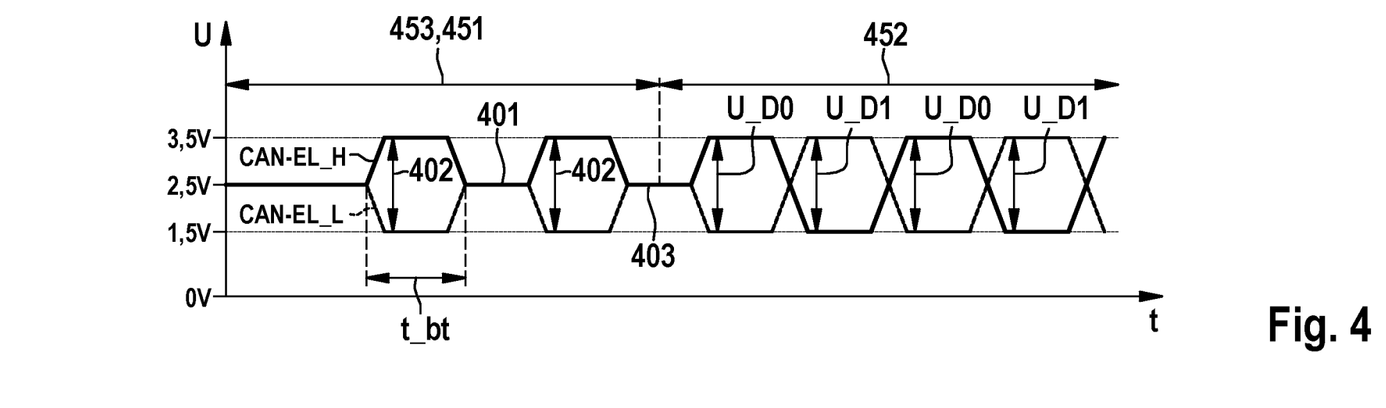
FIG. 4 shows a temporal profile of bus signals CAN EL_H and CAN EL_L which during normal operation result on a bus of the bus system according to the first exemplary embodiment of the present invention

During operation of bus system 1, transmitter 121 converts a transmission signal TXD or TxD of communication control device 11 into corresponding signals CAN EL_H and CAN EL_L for bus wires 41, 42, and transmits these signals CAN EL_H and CAN EL_L onto bus 40 at the terminals for CAN_H and CAN_L, as shown in FIG. 4.

Receiver 122 forms a reception signal RXD or RxD from signals CAN EL_H and CAN EL_L according to FIG. 4 that are received from bus 40, and passes it on to communication control device 11, as shown in FIG. 3. With the exception of an idle or standby state, transceiver device 12 with receiver 122 during normal operation always listens to a transfer of data or messages 45, 46 on bus 40, in particular regardless of whether or not transceiver device 12 is the sender of message 45.

According to the example of FIG. 4, signals CAN EL_H and CAN EL_L in above-mentioned communication phases 451, 453 have dominant and recessive bus levels 401, 402, as is used in CAN. In contrast, signals CAN EL_H and CAN EL_L in data phase 452 differ from conventional signals CAN_H and CAN_L, as described in greater detail below. A difference signal VDIFF=CAN EL_H−CAN EL_L shown in FIG. 5 forms on bus 40.

As is discernible from the left portion of FIG. 4, transmitter 121 drives dominant states 402 of differential signals CAN EL_H, CAN EL_L differently only in above-mentioned communication phases 451, 453. In contrast, the bus levels on bus line 3 for recessive states 401 in above-mentioned communication phases 451, 453 are equal to voltage Vcc or CAN_Supply of approximately 2.5 V, for example. Thus, a value of 0 V results for a voltage VDIFF=CAN EL_H−CAN EL_L for recessive states 401 (logical "0" of transmission signal TxD), and a value of approximately 2.0 V results for dominant states 402 (logical "1" of transmission signal TxD).

If transceiver device 12, in particular its device 15, detects the end of arbitration phase 451, transmitter 121 is switched over from the state shown in the left portion of FIG. 4 into the state for data phase 452 shown in the right portion of FIG. 4. Transmitter 121 is thus switched over from a first operating mode into a second operating mode.

According to the right portion of FIG. 4, in faster data phase 452, for signals CAN EL_H, CAN EL_L, bus states U_D0, U_D1 result, corresponding to data states Data_0 and Data_1 of transmission signal TxD.

Figure 5:
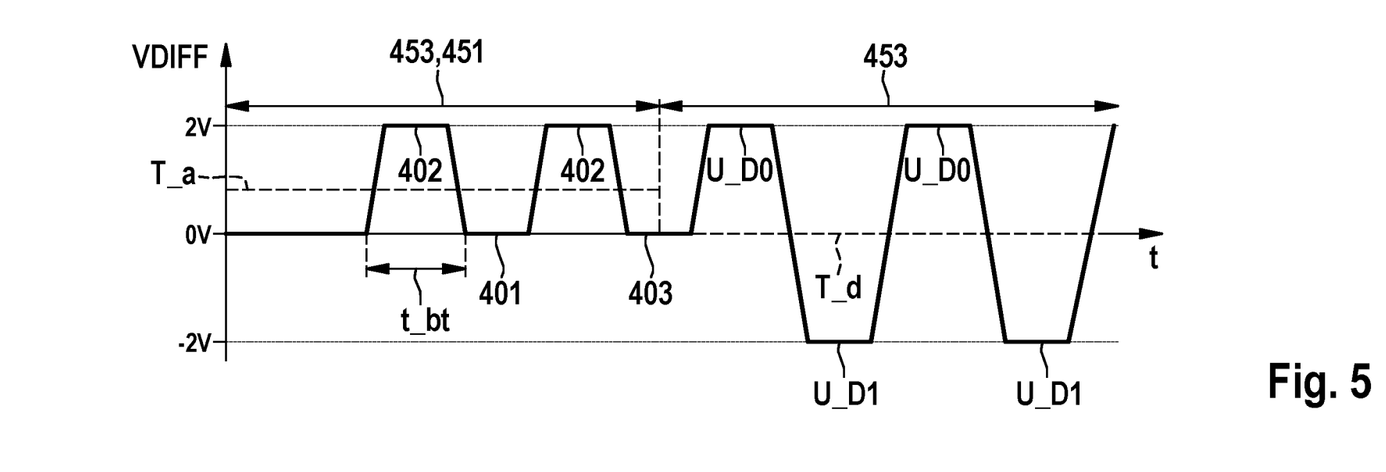
FIG. 5 shows a temporal profile of a differential voltage VDIFF that results from bus signals CAN EL_H and CAN EL_L from FIG. 4.

The sequence of data states Data_0 and Data_1, and thus of resulting bus states U_D0, U_D1 for signals CAN EL_H, CAN EL_L in FIG. 4 and the resulting profile of voltage VDIFF from FIG. 5, is used only to illustrate the function of transceiver device 10. The sequence of data states Data_0 and Data_1 and thus of bus states U_D0, U_D1 is selectable as needed.

In the states shown in FIG. 4 and described above, on the bus line of bus 40, bus levels between approximately −0.6 V and approximately −2 V are present for state Data_0, and bus levels between approximately 0.6 V and approximately 2 V are present for state Data_1, as illustrated in FIG. 5. Thus, for states Data_0 and Data_1, differential voltage VDIFF=CAN EL_H−CAN EL_L has in particular a maximum amplitude of approximately 1.4 V, even though FIG. 5 illustrates an amplitude for VDIFF as 2 V in a particular example.

In other words, in a first operating mode according to FIG. 4, transmitter 121 generates a first data state, for example Data_0, as bus state 402 with different bus levels for two bus wires 41, 42 of the bus line, and a second data state, for example Data_1, as bus state 401 with the same bus level for the two bus wires 41, 42 of the bus line of bus 40.

In addition, for the temporal profiles of signals CAN EL_H, CAN EL_L in a second operating mode that includes data phase 452, transmitter 121 forms first and second data states Data_0, Data_1 as bus state U_D0, U_D1, respectively, with different bus levels for the two bus wires 41, 42 of the bus line of bus 40.

As illustrated in FIG. 5, in communication phases 451, 453, receiver 122 uses first reception threshold T_a with the typical position of 0.7 V, used in CAN/CAN FD according to ISO 11898-2:2016, to be able to reliably recognize bus states 401, 402 in the first operating mode. In contrast, in data phase 452, receiver 122 uses a reception threshold T_d that is situated at approximately 0 V. For this purpose, reception threshold adaptation device 15 adapts reception threshold T_a for receiver 122 to reception threshold T_d or switches reception threshold T_a over to reception threshold T_d.

Furthermore, reception threshold adaptation device 15 additionally sets a reception threshold T_p1 for receiver 122 in data phase 452, as described with reference to FIGS. 6 through 9.

FIGS. 6 through 9 show for data phase 452 a signal profile of signals TxD1, TxD2, CAN EL_H, and CAN EL_L, and their differential voltage VDIFF=CAN EL_H−CAN EL_L. For the case shown in FIGS. 6 through 9, for example transmitter 121 transmits transmission signal TxD1 for a frame 450; for example user station 30, which in data phase 452 is actually only a receiver of frame 450, would like an abortion of frame 450 to take place.

There are various reasons for why an abortion of frame 450 is to take place:
- user station 30 as an RX user station has a higher-priority message 45, 46 to transmit, and/or
- user station 30 as an RX user station has determined an error in the cyclic redundancy check (CRC) header of CAN EL message 45, and would like to signal this, and/or
- user station 20, which is a CAN FD user station, has possibly not detected the switchover to the format of frame 450 due to a bit error, and transmits an error frame 47 during data phase 452 of frame 450.

Figure 6:
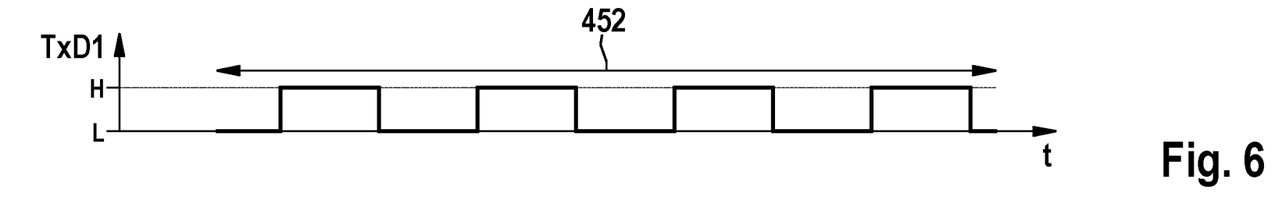
FIGS. 6 and 7 show a temporal profile of a transmission signal TxD1 in a data phase of a message that is transmitted from a first user station of the bus system according to the first exemplary embodiment, and of a transmission signal TxD2 that is transmitted from a different user station for aborting transmission signal TxD1.
Figure 7:
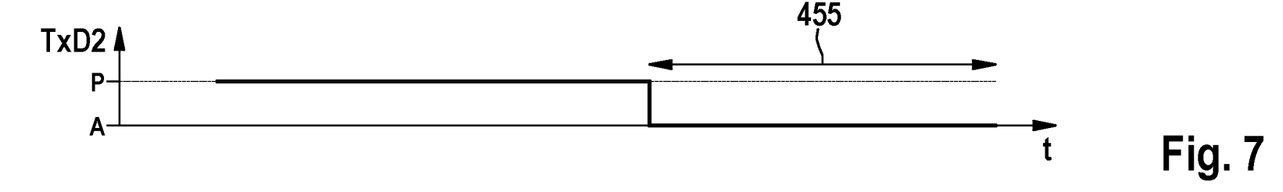
Figure 8:
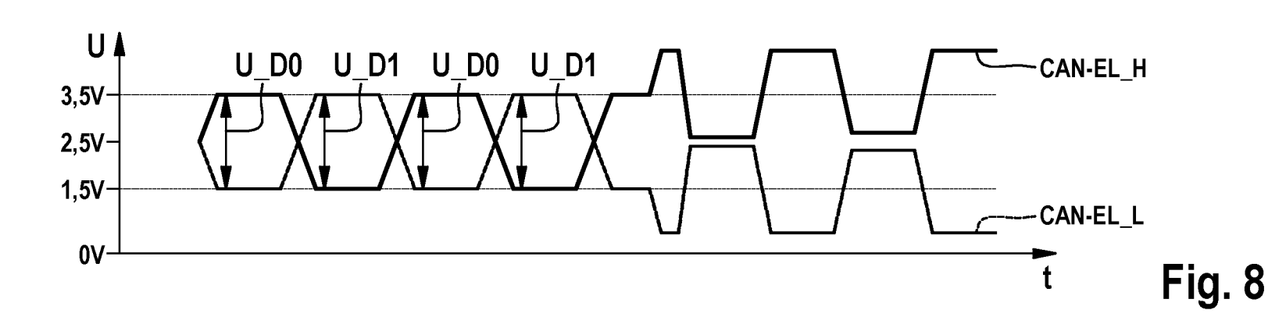
FIG. 8 shows a temporal profile of bus signals CAN EL_H and CAN EL_L that result due to transmission signals TxD1, TxD2 from FIGS. 6 and 7 on the bus.

For example, if user station 30 would like an abortion of frame 450, which transmitter 121 transmits via signal TxD1 from FIG. 6, to take place, user station 30 transmits transmission signal TxD2 according to FIG. 7 to bus 40. This results in the signal profiles for CAN EL_H and CAN EL_L and their differential voltage VDIFF. In phase 455 of the transmission of error frame 47, which begins with the falling edge of transmission signal TxD2, this results in voltage states on bus 40 that differ from the voltage states on bus 40 during normal operation of data phase 452.

Figure 9:
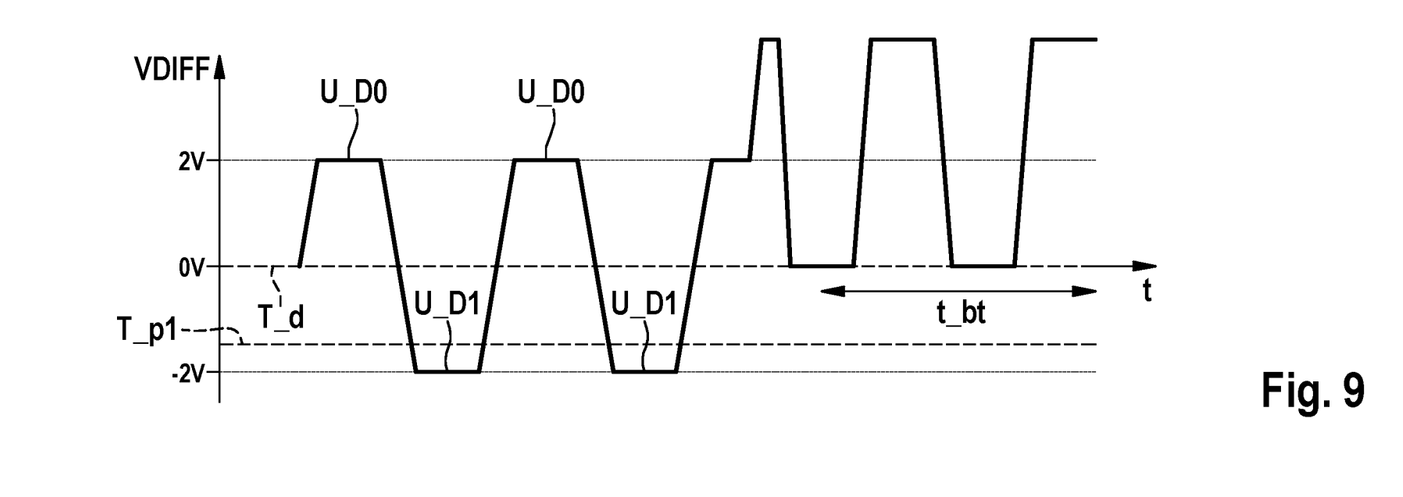
FIG. 9 shows a temporal profile of a differential voltage VDIFF which results from bus signals CAN EL_H and CAN EL_L from FIG. 8, and which is evaluated using reception thresholds of a receiver according to the first exemplary embodiment of the present invention.

In general, the transmitting user station, which transmits transmission signal TxD1, in data phase 452 switches over to an operation in which both logical levels are driven with different differential voltages, whereas for all receiving user stations, such as user station 30, the different reception thresholds Td, T_p1 shown in FIG. 9 are switched on as described below. However, the bus driver of receiving user station 30 remains in the receiving state (CAN recessive state) until receiving user station 30 possibly transmits error frame 47, as shown in FIG. 7 for transmission signal TxD2 and mentioned above. Error frame 47 according to the right portion of FIG. 7 may then be transmitted as "dominant" or as a differential voltage for the logical level "0." Since both alternatives are possible, the two states in FIG. 7 for transmission signal TxD2 are denoted as P for passive and A for active.

In the case described above, if user station 30 transmits an error frame 47 while transmission signal is TxD1=H, differential voltage VDIFF increases. Therefore, it is no longer possible to detect voltage states of differential voltage VDIFF with second reception threshold T_p1 of data phase 452.

Thus, if receiver 122 of user station 10 detects that differential voltage VDIFF no longer falls below reception threshold T_p1, receiver 122 recognizes that a transmission conflict is present on bus 40. Namely, in data phase 452, transmitter 121 no longer has exclusive, collision-free access to bus 40. Receiver 122 detects this transmission conflict on bus 40, regardless of whether first reception threshold T_d of data phase 452 is still triggered or not.

In the described assessment of whether or not a transmission conflict is present, receiver 122 or transceiver device 12 takes into account the signal propagation times in bus system 1, which result in a temporal offset of transmission signal TXD with respect to signals CAN EL_H and CAN EL_L on bus 40 all the way to the output of receiver 122 at which reception signal RXD is output. The propagation times for the described assessment are compensated for. In particular, the propagation times of signals CAN EL_H and CAN EL_L on bus 40 for the described assessment are compensated for.

The signaling of the conflict in data phase 452 takes place via a signal from receiver 122 or transceiver device 12 to communication control device 11. The signal may be reception signal RXD, which receiver 122 or transceiver device 12 modifies with a predetermined bit pattern in order to signal the conflict. Alternatively or additionally, receiver 122 or transceiver device 12 may generate a separate signal S1 that is transmitted to communication control device 11 via a separate signal line, and that in particular includes at least one switching pulse or a predetermined bit pattern for signaling the conflict. Due to the transmission conflict being signaled to communication control device 11 in data phase 452, the bit error check, customary in conventional CAN by comparing transmission signal TXD to reception signal RXD, may be replaced by checking the conflict signaling signal. The conflict signaling signal has in particular a predetermined bit pattern that signals the transmission conflict. In particular, the conflict signaling signal may transmit a "1" as an "OK signal" and a "0" as a "conflict report."

In data phase 452, communication control device 11 responds to the signaled transmission conflict by aborting data phase 452, and optionally also by transmitting a bit pattern that signals the end of data phase 452 to the other user stations 20, 30.

According to one modification of the assessment described above, in a further variant, reception threshold T_p1 in a defined time window t_P according to FIG. 9 is checked as to whether differential voltage VDIFF no longer falls below reception threshold T_p1. Time window t_P is selected in particular in such a way that during the data transfer in data phase 452, reception threshold T_p1 would have to be fallen short of at least two times. If this is not the case, receiver 122 or transceiver device 12 recognizes that the transmission conflict is present.

The advantage of the stated modification or second variant is that the consideration of transmission signal TxD1 and its propagation time compensation is not necessary.

Time window t_P is optionally selectively configurable. Receiver 122 or transceiver device 12 is thus very advantageously adaptable to the particular conditions of bus system 1.

In the above-described variants of the assessment, it is particularly advantageous that the embodiment of receiver 122 or transceiver device 12 is usable for homogeneous CAN EL bus systems, in which only CAN EL messages 45 and no CAN FD messages 46 are sent, as well as for mixed bus systems, in which either CAN EL messages 45 or CAN FD messages 46 are sent. Receiver 122 or transceiver device 12 is therefore universally usable.

Figure 10:
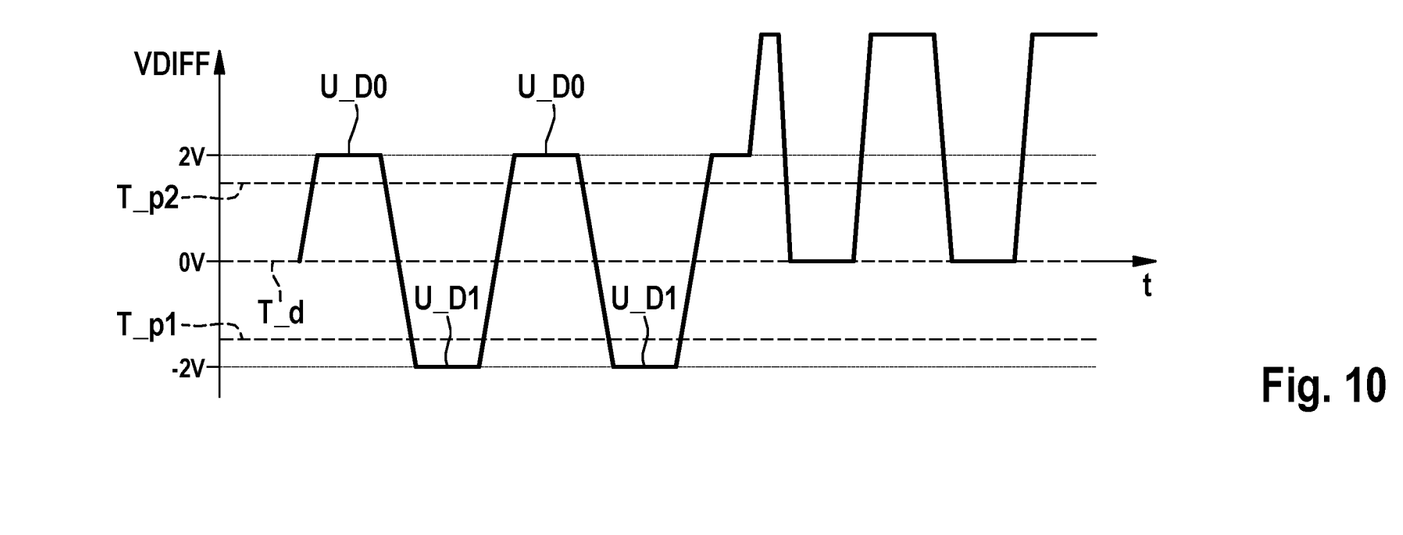
FIGS. 10 through 13 each show the temporal profile of differential voltage VDIFF from FIG. 9, which is evaluated using reception thresholds of a receiver according to a second through fifth exemplary embodiment of the present invention.

FIG. 10 illustrates one embodiment of reception threshold adaptation device 15 and of receiver 122 or transceiver device 12 according to a second exemplary embodiment. Except for the differences described below, reception threshold adaptation device 15 and receiver 122 or transceiver device 12 according to the present exemplary embodiment have the same design as reception threshold adaptation device 15 and receiver 122 or transceiver device 12 according to the preceding exemplary embodiment.

According to FIG. 10, reception threshold adaptation device 15 additionally switches in a third reception threshold T_p2 in the data phase.

With reception threshold T_p2 it is apparent when, due to transmission signal TxD1 on bus 40, a bus state U_D0 drives against a bus state U_D1 due to a transmission signal TxD2 of some other user station, for example when user station 30 has not recognized that it has lost the arbitration against user station 10. T_p2 is therefore provided only as a third threshold.

Receiver 122 may thus use reception threshold T_p2 in addition to thresholds T_d, T_p1 for the assessment in order to detect the VDIFF levels on bus 40 for TxD1=H, as described above.

In this way, an even further plausibility check may be made that a transmission conflict is present on bus 40, and a distinction may be made between the conflict case of transmitting an error frame 47 (error flag) and the conflict case of transmitting due to the unrecognized lost arbitration.

As a result, in reception signal RXD or signal S1 it may be signaled to communication control device 11 which transmission conflict has occurred. Thus, communication control device 11 may not only carry out the abortion of data phase 452, but with the transmission of a bit pattern may optionally also signal the end of data phase 452 to the other user stations 20, 30 and optionally communicate information about the type of transmission conflict.

Figure 11:
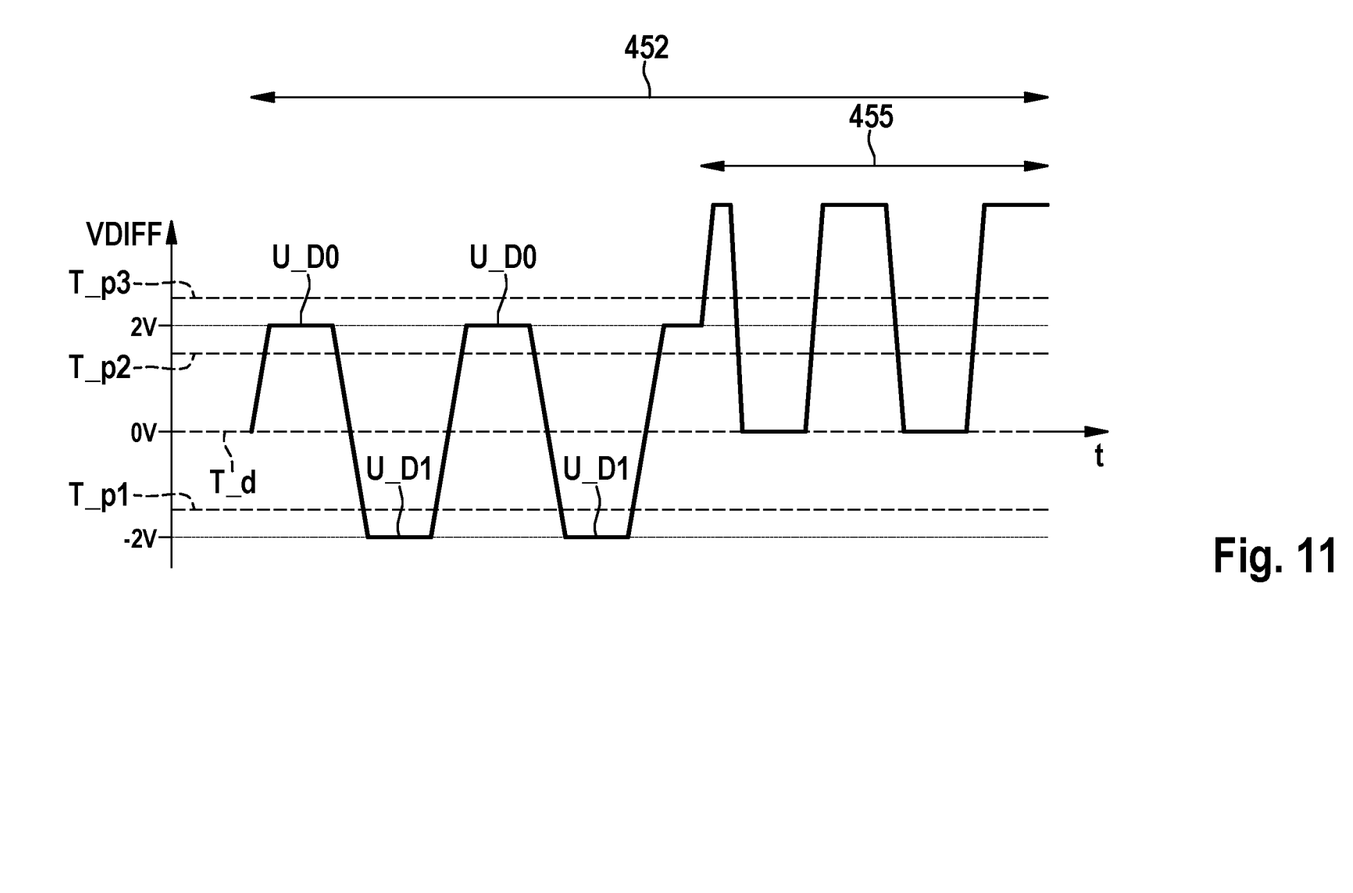

FIG. 11 illustrates one embodiment of reception threshold adaptation device 15 and of receiver 122 or transceiver device 12 according to a third exemplary embodiment. Except for the differences described below, reception threshold adaptation device 15 and receiver 122 or transceiver device 12 according to the present exemplary embodiment have the same design as reception threshold adaptation device 15 and receiver 122 or transceiver device 12 according to the preceding exemplary embodiment.

According to FIG. 11, reception threshold adaptation device 15 additionally switches on a fourth reception threshold T_p3 in the data phase. Receiver 122 may thus use reception threshold T_p2 in addition to thresholds T_d, T_p1, T_p2 for the assessment in order to detect the levels of differential voltage VDIFF for transmission signal TxD1=H, as described above. If an exceedance of reception threshold T_p3 is present here in the case of TxD1=0 and of error frame 47 (error flag) of transmission signal TxD2, this indicates that multiple user stations 10, 20, 30 are attempting to drive bus 40, for example with an error frame 47 (error flag).

Reception threshold T_p3 has a value that is greater than the largest voltage value that is driven by a user station 10, 20, 30 of bus system 1 for a bus state in second communication phase 452. With reception threshold T_p3, a transmission conflict is apparent which occurs when a bus state U_D0, generated by transceiver device 12 due to transmission signal TxD1 on bus 40, is increased by an error frame 47, error frame 47 being driven as dominant or also as U_D0.

Thus, an even better plausibility check may be made that a transmission conflict is present on bus 40, in particular the conflict case of transmitting an error frame 47 (error flag).

As a result, in reception signal RXD or signal S1 it may be signaled to communication control device 11 which transmission conflict has occurred. Thus, communication control device 11 may not only carry out the abortion of data phase 452, but with the transmission of a bit pattern may optionally also signal the end of data phase 452 to the other user stations 20, 30 and optionally communicate information about the type of transmission conflict.

Figure 12:
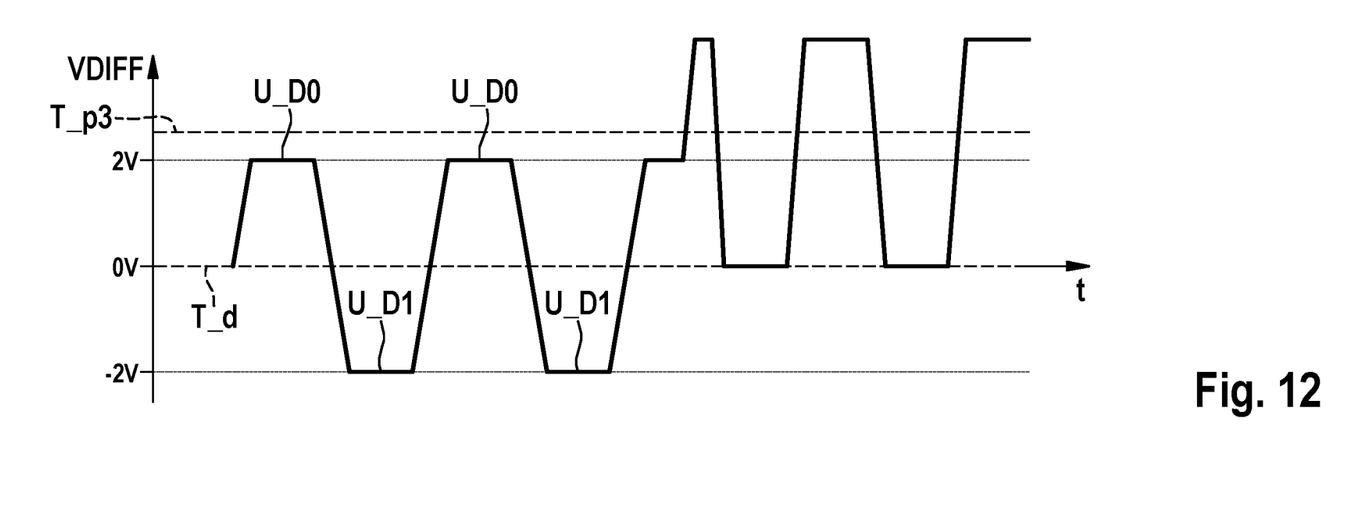

FIG. 12 illustrates one embodiment of reception threshold adaptation device 15 and of receiver 122 or transceiver device 12 according to a fourth exemplary embodiment. Except for the differences described below, reception threshold adaptation device 15 and receiver 122 or transceiver device 12 according to the present exemplary embodiment have the same design as reception threshold adaptation device 15 and receiver 122 or transceiver device 12 according to the first exemplary embodiment.

According to FIG. 12, in addition to reception threshold T_d, reception threshold adaptation device 15 switches on only reception threshold T_p3 as a second reception threshold in data phase 452. Receiver 122 may thus use reception threshold T_p3 in addition to reception threshold T_d for the assessment in order to detect the levels of differential voltage VDIFF in the transmission signal TxD1=H, as described above. If an exceedance of reception threshold T_p3 is present here in the case of TxD1=0 and of error frame 47 (error flag) of transmission signal TxD2, this indicates that multiple user stations 10, 20, 30 are attempting to drive bus 40, for example with an error frame 47 (error flag).

It may thus be recognized that a transmission conflict is present on bus 40, in particular the conflict case of transmitting an error frame 47 (error flag).

Figure 13:
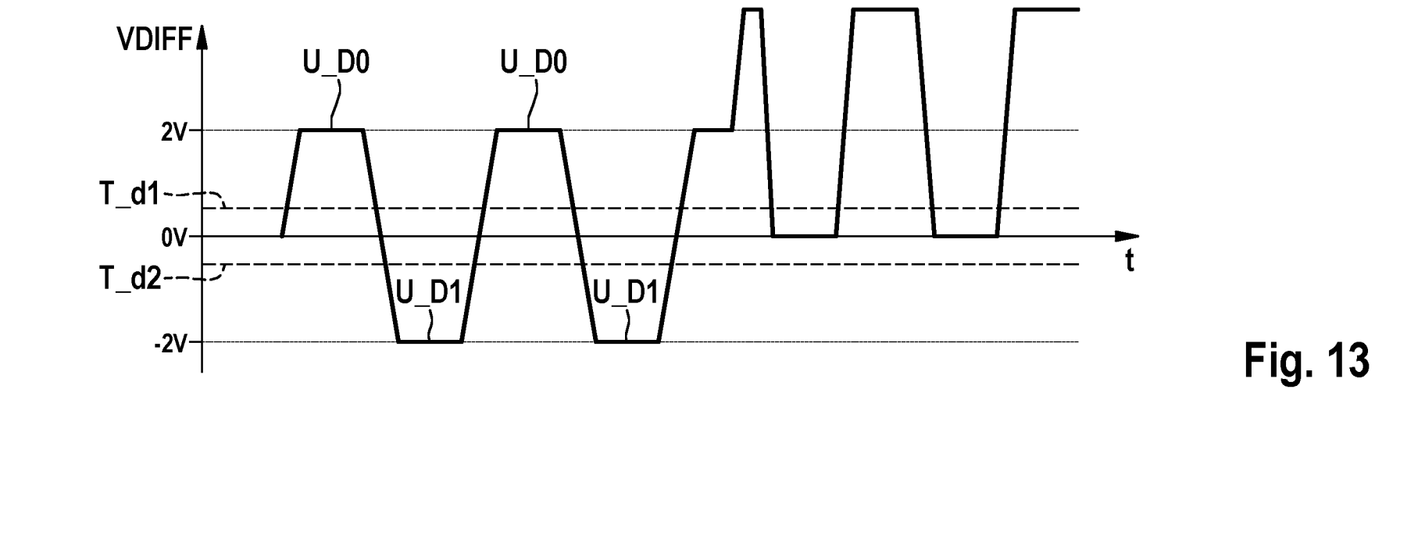

FIG. 13 illustrates one embodiment of reception threshold adaptation device 15 and of receiver 122 or transceiver device 12 according to a fifth exemplary embodiment. Except for the differences described below, reception threshold adaptation device 15 and receiver 122 or transceiver device 12 according to the present exemplary embodiment have the same design as reception threshold adaptation device 15 and receiver 122 or transceiver device 12 according to the first exemplary embodiment.

According to FIG. 13, reception threshold adaptation device 15 switches on a first reception threshold T_d1 and a second reception threshold T_d2 in the data phase.

The following applies for the position of threshold T_d1: $0\text{ V} < T\_data1 < VDIFF0\_min$. VDIFF0_min is the minimum voltage that occurs for differential voltage VDIFF of state U_D0.

The following applies for the position of threshold T_d2: $VDIFF1\_max < T\_data2 < 0\text{ V}$. VDIFF0_max is the maximum voltage that occurs for differential voltage VDIFF of state U_D1.

For conflict-free transmission of data, in logical state 0 or state U_D0 both thresholds T_d1, T_d2 are exceeded; likewise, in logical state 1 or state U_D1 both thresholds T_d1, T_d2 are fallen short. If some other user station, for example user station 30, now transmits an error frame 47 (error flag), as shown with transmission signal TxD2 from FIG. 7, by increasing differential voltage VDIFF only threshold T_d1 is still exceeded or fallen short, depending on the bus state. In contrast, threshold T_d2 is no longer fallen short. In this case, the conflict is recognized by receiver 122 or transceiver device 12.

Combining reception thresholds T_d1 and T_d2 has the advantage that reception threshold T_d1 in data phase 452 may be equal to reception threshold T_a in arbitration phase 451. Therefore, in this embodiment it is not necessary to switch over thresholds T_a, T_d1, but, rather, only to connect or disconnect reception threshold T_d2. This simplifies the electrical circuit in user stations 10, 30.

If transceiver device 12 uses only reception thresholds T_d1 and T_d2, as a single transmission conflict it may be recognized that a "1" drives against a "0" on bus 40. However, the gain by two equal levels is not recognized.

It may thus be recognized that a transmission conflict is present on bus 40, in particular the conflict case of transmitting an error frame 47 (error flag).

According to a sixth exemplary embodiment, receiver 122 or transceiver device 12 is additionally designed according to one of the preceding exemplary embodiments to make an assessment of particular reception thresholds T_d, T_d1, T_d2, T_p1, T_p2, T_p3 that are present, and an assessment of the temporal correlation between transmission signal TXD or TxD1 and received signal RXD of particular user station 10, 30.

According to a seventh exemplary embodiment, reception threshold adaptation device 15 and/or receiver 122 or transceiver device 12 according to one of the preceding exemplary embodiments are/is designed to respond to an error frame 47 (error flag) for which differential voltage VDIFF is negative. If this type of error frame 47 (error flag) is used in bus system 1, reception threshold adaptation device 15 and/or receiver 122 or transceiver device 12 negate(s) particular reception threshold T_d1, T_d2, T_p1, T_p2, T_p3 that is present.

All of the above-described embodiments of devices 15, 35, of user stations 10, 20, 30, 100, of bus system 1, and of the method carried out therein may be used alone or in any possible combination. In particular, all features of the above-described exemplary embodiments and/or modifications thereof may be arbitrarily combined. Additionally or alternatively, in particular the following modifications are possible.

Reception thresholds T_d1, T_d2, T_p1, T_p2, T_p3 shown in the figures are based on the assumption that in bus system 1, bus states U_D0, U_D1 are driven inversely with respect to one another with VDIFF levels of equal magnitude. Alternatively, however, it is possible to use reception thresholds T_d1, T_d2, T_p1, T_p2, T_p3 also in the case when bus states U_D0 and U_D1 are driven, for example, with two different positive VDIFF levels. In such a case, reception thresholds T_d1, T_d2, T_p1, T_p2, T_p3 are to be adapted to these VDIFF levels. For example, reception thresholds T_d1 and T_d2 would then be symmetrically situated above and below the average value of the two VDIFF levels.

Although the present invention is described above with the example of the CAN bus system, the present invention may be employed for any communications network and/or communication method in which two different communication phases are used in which the bus states, which are generated for the different communication phases, differ. In particular, the present invention is usable for developments of other serial communications networks, such as Ethernet and/or 100Base-T1 Ethernet, field bus systems, etc.

In particular, bus system 1 according to the exemplary embodiments may be a communications network in which data are serially transferrable at two different bit rates. It is advantageous, but not a mandatory requirement, that in bus system 1, exclusive, collision-free access of a user station 10, 20, 30 to a shared channel is ensured, at least for certain time periods.

The number and arrangement of user stations 10, 20, 30, 100 in bus system 1 of the exemplary embodiments is arbitrary. In particular, user station 20 in bus system 1 may be dispensed with. It is possible for one or more of user stations 10 or 30 to be present in bus system 1. It is possible for all user stations in bus system 1 to have the same design, i.e., for only user station 10 or only user station 30 to be present.

The number of reception thresholds T_p1, T_p2, T_p3 which are to be switched on in addition to first reception threshold T_u in data phase 452, or to which reception threshold T_a is switched over in data phase 452, may also be increased even further than described above. The plausibility check of the detection of a transmission conflict may thus be even further improved.

However, the complexity of evaluating the thresholds increases with the number of reception thresholds T_d, T_p1, T_p2, T_p3 T_d1, T_d2, used.

All variants described above for detecting the transmission conflict may be subjected to temporal filtering to increase the robustness with regard to electromagnetic compatibility (EMC) and electrostatic discharge (ESD), pulses, and other disturbances.

In addition, it is possible to shorten bit time duration t_bt in data phase 452 in comparison to bit time duration t_bt in arbitration phase 451 and frame end phase 453. In this case, transmission is carried out with a higher bit rate in data phase 452 than in arbitration phase 451 and frame end phase 453. The transfer speed in bus system 1 may thus be even further increased.

The invention claimed is:

1. A device for a serial bus system, comprising:
a receiver, wherein the receiver is configured to:
receive a signal from a bus of the bus system, in which, for a message that is exchanged between user stations of the bus system, bus states of the signal received from the bus in a first communication phase differ from bus states of the signal received in a second communication phase;
generate a digital signal based on the signal received from the bus;
output the digital signal to a communication control device in order to evaluate data contained in the digital signal; and
use at least one first reception threshold and one second reception threshold in the second communication phase in order to generate the digital signal, the second reception threshold having a negative voltage value or the second reception threshold having a voltage value that is greater than a largest voltage value that is user-station-driven, by at least one of the user stations of the bus system, for a bus state in the second communication phase.

2. The device as recited in claim 1, wherein the receiver is configured to check, in a defined time window, whether the signal received from the bus no longer falls below or exceeds the second reception threshold.

3. The device as recited in claim 1, wherein, in the second communication phase, the receiver is configured to use two reception thresholds, whose voltage values are equal in magnitude, for generating the digital signal.

4. The device as recited in claim 1, wherein, in the second communication phase, for generating the digital signal, the receiver is configured to use, in addition to the first reception threshold, the second reception threshold and a third reception threshold, voltage values of the second and third reception thresholds being equal in magnitude.

5. The device as recited in claim 4, wherein:
in the second communication phase, for generating the digital signal the receiver is configured to use the second reception threshold having the voltage value that is greater than the largest user-station driven voltage value for the bus state in the second communication phase; and
a different transmission conflict is detectable with the third reception threshold than with the second reception threshold having the voltage value that is greater than the largest user-station driven voltage value for the bus state in the second communication phase.

6. The device as recited in claim 1, wherein, in the first communication phase, the receiver is configured to use a reception threshold whose voltage value differs from voltage values of reception thresholds of the second communication phase.

7. The device as recited in claim 1, wherein, the bus states of the signal received from the bus in the first communication phase are generated with a different physical layer than the bus states of the signal received in the second communication phase.

8. The device as recited in claim 1, wherein, in the first communication phase, it is negotiated which of the user stations of the bus system in a subsequent second communication phase obtains, at least temporarily, exclusive, collision-free access to the bus.

9. The device as recited in claim 1, further comprising:
a reception threshold adaptation device configured to evaluate the signal received from the bus with regard to a communication phase present at the time, and to switch a voltage value and a number of reception thresholds used based on a result of the evaluation.

10. The device as recited in claim 1, further comprising:
a reception threshold adaptation device, wherein the reception threshold adaptation device is configured to switch the first reception threshold over to a different reception threshold when, after the first communication phase, in which an exclusive, collision-free access of a user station to the bus of the bus system is not ensured, a switch is made over to a communication phase with the exclusive, collision-free access to the bus.

11. The device as recited in claim 1, further comprising:
a transmitter that is configured to: transmit messages onto a bus of the bus system; and
switch between a first operating mode and a second operating mode during transmission of various communication phases of a message.

12. The device as recited in claim 11, wherein:
the bus states include a first data state and a second data state;
in the first operating mode, the transmitter is configured to generate the first data state with bus levels for two bus wires of the bus line differing from each other, and the second data state with the two bus wires of the bus line being at a same bus level as each other; and
in the second operating mode, the transmitter is configured to generate each of the first and second data states, respectively, with the bus levels for the two bus wires of the bus line differing from each other.

13. A user station for a serial bus system, comprising:
a communication control device configured to control a communication of the user station with at least one other user station of the bus system; and
a signal-handling device including a receiver, wherein the receiver is configured to:
receive a signal from a bus of the bus system, in which, for a message that is exchanged between the user stations of the bus system, bus states of the signal received from the bus in a first communication phase differ from bus states of the signal received in a second communication phase;
generate a digital reception signal based on the signal received from the bus;
output the digital reception signal to the communication control device in order to evaluate data contained in the digital reception signal; and
use at least one first reception threshold and one second reception threshold in the second communication phase in order to generate the digital reception signal, the second reception threshold having a negative voltage value or the second reception threshold having a voltage value that is greater than a largest voltage value that is driven by at least one of the user stations of the bus system for a bus state in the second communication phase.

14. The user station as recited in claim 13, wherein:

the signal-handling device is configured to signal to the communication control device via the digital reception signal or via a separate signal that is provided via a separate line than the digital reception signal when an evaluation of the reception thresholds and a temporal correlation between a transmission signal and the digital reception signal show that a transmission conflict is present on the bus; and the communication control device is configured to generate or abort the transmission signal based on the digital reception signal or the separate signal and/or to signal the transmission conflict to other user stations of the bus system.

15. A bus system, comprising:

a bus; and at least two user stations that are connected to one another via the bus in such a way that they are able to communicate serially with one another;

wherein each of at least one of the user stations includes:

a communication control device configured to control a communication of the respective user station with at least one other of the user stations of the bus system; and a signal-handling device including a receiver, the receiver being configured to:

receive a signal from the bus of the bus system, in which, for a message that is exchanged between the user stations of the bus system, bus states of the signal received from the bus in a first communication phase differ from bus states of the signal received in a second communication phase;

generate a digital signal based on the signal received from the bus;

output the digital signal to the communication control device in order to evaluate data contained in the digital signal; and use at least one first reception threshold and one second reception threshold in the second communication phase in order to generate the digital signal, the second reception threshold having a negative voltage value or the second reception threshold having a voltage value that is greater than a largest voltage value that is driven by at least one of the user stations of the bus system for a bus state in the second communication phase.

16. A method for communicating in a serial bus system, the method being carried out using a receiver carrying out the following steps:

receiving a signal from a bus of the bus system, in which, for a message that is exchanged between user stations of the bus system, bus states of the signal received from the bus in a first communication phase differ from bus states of the signal received in a second communication phase;

generating a digital signal based on the signal received from the bus;

outputting the generated digital signal to a communication control device in order to evaluate data contained in the digital signal; and using at least one first reception threshold and one second reception threshold in the second communication phase in order to generate the digital signal, the second reception threshold having a negative voltage value or the second reception threshold having a voltage value that is greater than a largest voltage value that is driven by at least one of the user stations of the bus system for a bus state in the second communication phase.

\* \* \* \* \*